United States Patent [19]

Czajkowski

[11] Patent Number: 5,357,810
[45] Date of Patent: Oct. 25, 1994

[54] AIR FLOW MEASURING APPARATUS

[75] Inventor: Stanislaw B. Czajkowski, Limerick, Israel

[73] Assignee: Suparules Limited, Limerick, Israel

[21] Appl. No.: 140,771

[22] Filed: Oct. 21, 1993

Related U.S. Application Data

[62] Division of Ser. No. 796,770, Nov. 25, 1991, Pat. No. 5,282,388.

[30] Foreign Application Priority Data

Nov. 26, 1990 [IL] Israel .................. 0/4265/90

[51] Int. Cl.⁵ .............................................. G01L 5/24
[52] U.S. Cl. ............................ 73/861.28; 73/861.27; 73/170.13
[58] Field of Search ......... 73/861.27, 861.28, DIG. 4, 73/170.13, 170.11, 597, 622; 381/190

[56] References Cited

U.S. PATENT DOCUMENTS

| 3,782,193 | 1/1974 | Meyer et al. | 73/861.27 X |
| 4,294,122 | 10/1981 | Couchman | 73/761 |
| 4,615,214 | 10/1986 | Burns | 73/DIG. 4 X |
| 4,846,001 | 7/1989 | Kibblewhite | 73/761 |
| 4,899,591 | 2/1990 | Kibblewhite | 73/761 |
| 5,029,480 | 7/1991 | Kibblewhite | 73/761 |

Primary Examiner—Richard E. Chilcot, Jr.
Assistant Examiner—Elizabeth L. Dougherty
Attorney, Agent, or Firm—Ladas & Parry

[57] ABSTRACT

An ultrasonic transducer includes a film of piezoelectric material mounted on the support column. Two overlapping metal foil electrodes are in intimate contact with the two opposite surfaces of the film respectively, and a respective electrical lead is connected to each electrode.

4 Claims, 6 Drawing Sheets

AIR FLOW MEASURING APPARATUS

This is a divisional application of my copending patent application Ser. No. 07/796,770 filed Nov. 25, 1991, now U.S. Pat. No. 5,282,388.

This invention relates to an ultrasonic transducer.

Currently there are on the market are two basic types of instrument capable of measuring the speed of an air flow.

The first type of instrument has a "fan" which rotates in the wind and is either optically coupled or "Hall Effect" coupled to a counter which counts the rotations and displays the result as an air flow speed. However, these devices have appreciable inertia and resistance to movement and are of sufficient size that they cause a significant deflection of the air flow they are trying to measure. Thus they are very inaccurate, especially at low air flow speeds.

The second type of instrument uses a heating element which is heated up to a know fixed temperature, and when the element is exposed to a flow of air the instrument calculates the power required to maintain the known fixed temperature. The power required is related to the air flow speed. This type of instrument is very sensitive to movements of air, but it is not very accurate and has a high power consumption.

It is an object of the present invention to provide an apparatus for measuring the speed of air flow which permits these disadvantages to be mitigated.

According to the present invention there is provided an apparatus for measuring the speed of an air flow, comprising a sonic transmitter and a sonic detector mounted spaced apart for insertion in the air flow, means for causing the transmitter to transmit at least one burst of sound towards the detector, and means for deriving the speed of the air flow as a function of the time taken for the burst to reach the detector.

Preferably the transmitter and detector comprise respective ultrasonic transducers mounted on the exterior of a portable hand-held housing.

In the embodiment of the invention the apparatus has a feedback circuit between the transmitter and the detector operative to trigger the transmitter to transmit a further burst of sound in response to the detection of a previous burst of sound at the detector, such that a single initial burst transmitted by the transmitter produces a series of following bursts, and wherein the means for deriving the speed of the air flow comprises means for counting the number of bursts detected in a pre-determined time period.

In the preferred embodiment, the period of time for which the bursts are counted is one second.

The burst transmitted by the transmitter is preferably of ultrasonic frequency, that is to say greater than 35 KHz, to avoid interference from ambient noise at acoustic frequencies. Preferably the frequency of the burst is 100 KHz.

The transmitter and detector preferably have a very low Q, of about one, to permit the transmission and detection of many very short well-defined bursts, say 5000 or more bursts per second each 40 us (40 microseconds) in duration. This permits the transmitter and detector to be located quite close together, say 0.1 meter or less apart, because then the transmitter will have finished transmitting one burst before it is triggered to transmit the next, so that the bursts are clearly distinguishable at the detector.

The transmitter and detector may have a higher Q, but this leads to ringing and a less well defined start and finish to each burst, so that the transmitter and detector have to be further apart to ensure that each individual burst is reliably detected at the detector. This is within the scope of the invention, but a small transmitter/detector gap is preferred because it permits the apparatus to be built as a very compact portable hand-held device.

Preferably each transducer comprises a film of piezoelectric material having two at least partially overlapping electrodes respectively in intimate contact with each of its two opposite surfaces, the film being mounted on a support member. These can be constructed to have a low Q, as preferred for this invention.

Such piezoelectric film transducers have utility in applications other than for measuring the speed of an air flow, and thus constitute an independent invention.

Conventional ceramic ultrasonic transducers may be used in this invention, but as these have a higher Q they will require a transmitter/detector spacing of at least 0.2 meter.

An embodiment of the invention will now be described, by way of example, with reference to the accompanying drawings, wherein.

Figure 1:
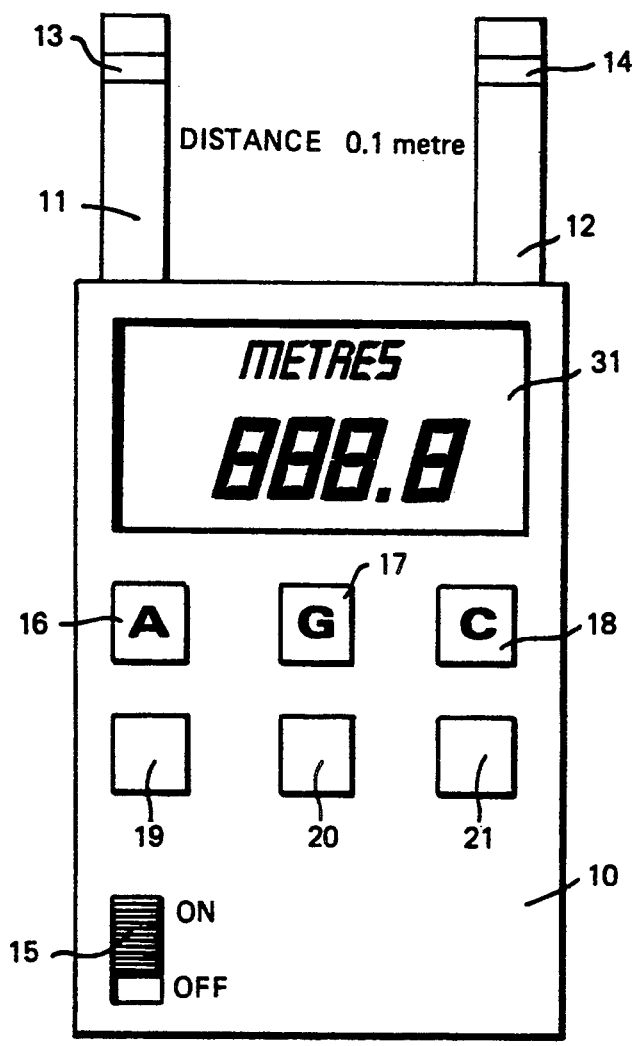
FIG. 1 is an external view of the embodiment of an apparatus according to the invention, constructed as a hand-held device.

Referring to FIG. 1, externally the apparatus comprises a portable hand-held housing 10 from the top of which project two support members 11 and 12 carrying ultrasonic transducers 13 and 14 respectively. The transducer 13 is an ultrasonic transmitter, and the transducer 14 is an ultrasonic detector. They are fixed 0.1 meter (about 4 inches) apart. The transducers preferably having a very low Q, as near to one as possible, and their construction will be described below.

The front face of the housing 10 has an ON-OFF switch 15, and a keypad comprising a number of pushbutton keys 16–21. In particular there is an AUTO key 16, a CALIBRATE key 17, and a start or GO key 18. These keys control the mode of operation of the apparatus, as will be described.

There is also a liquid crystal display (LCD) 31, upon which the result of the measurement of air flow speed is ultimately displayed. The keys 19 to 21 provide various alternative formats for the display, for example knots, meters per second, miles per hour, etc.

Figure 2:
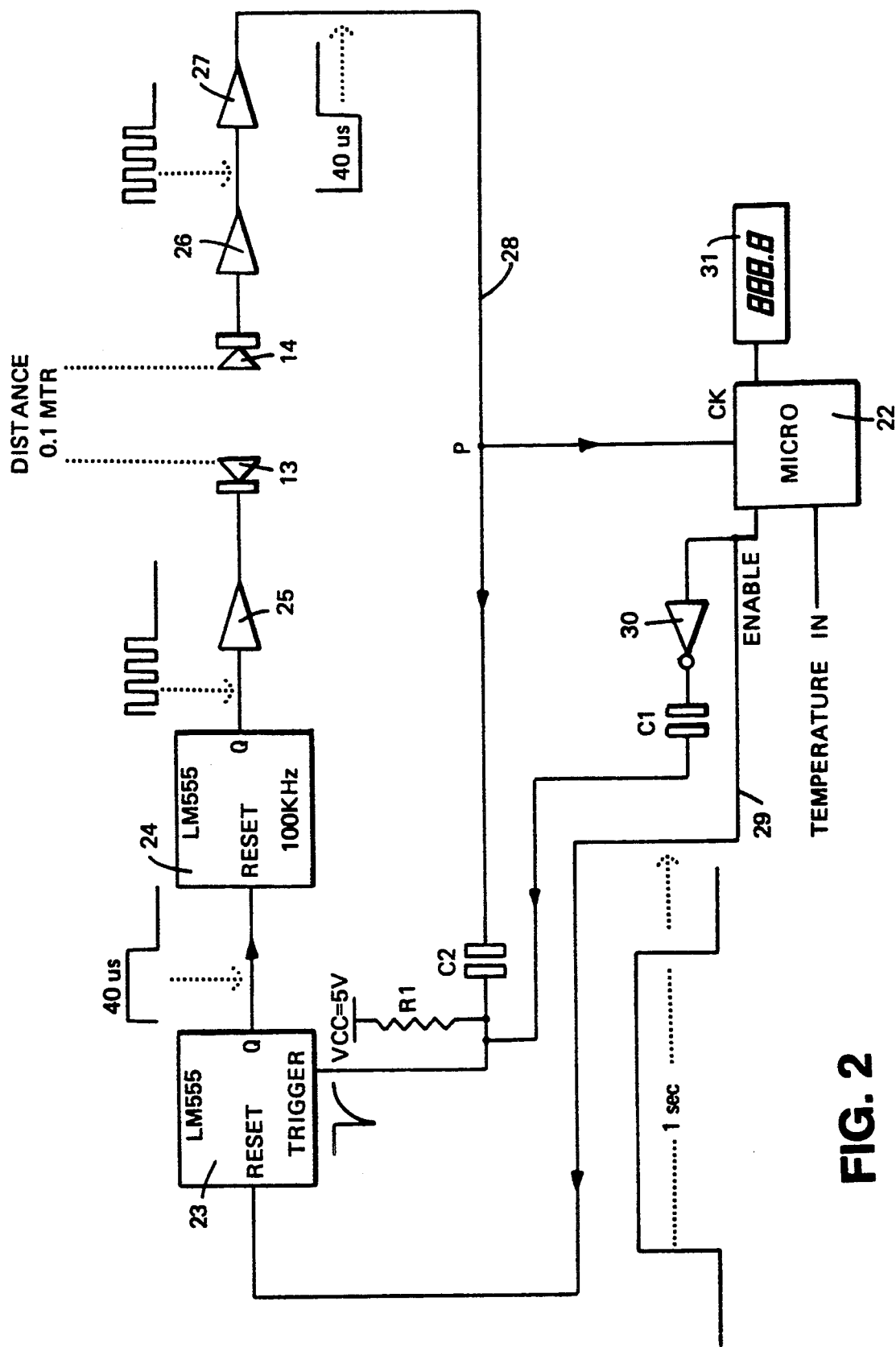
FIG. 2 is a block circuit diagram of the working components of the apparatus.

Turning now to FIG. 2, the internal circuit of the apparatus comprises a LM555 timer chip 23 configured as a monostable. Provided that its RESET input is high, the monostable 23 is triggered by each negative-going edge at its TRIGGER input to provide a respective single output pulse at its Q output of 40 us (40 microseconds) duration.

A further LM555 timer chip 24, in this case configured as a 100 KHz gated oscillator, has its RESET input connected to the Q output of the monostable 23. Each 40 us output pulse from the monostable 23 is thus applied to the RESET input of the oscillator 24, and serves to gate the oscillator. The oscillator 24 provides a short burst of oscillations of 40 us duration at its Q output in response to each such 40 us pulse from the monostable 23. Since the oscillator frequency is 100 KHz, each burst comprises about 4 cycles.

Each 40 us burst from the oscillator is applied to the ultrasonic transmitter 13 via a driver 25. Thus the transmitter transmits a 40 us burst of ultrasound across the 0.1 meter gap towards the ultrasonic detector 14.

When received at the detector 14, the burst is amplified in the high gain amplifier 26 back to the circuit VCC of 5 volts, and then passes to an envelope detector (pump circuit) 27 which reconstitutes (so far as circuit degradation will allow) the original 40 us burst from the monostable 23, and inverts it.

This inverted pulse CK passes along a feedback line 28 to an RC circuit consisting of a capacitor C2 and a resistor R1. This RC circuit derives a short negative-going pulse of about 1 us (1 microsecond) from the leading (negative-going) edge of the inverted pulse from the envelope detector 27, which is applied to the TRIGGER input of the monostable 23.

Provided that the RESET input to the monostable is still high, this in turn triggers a fresh pulse from the Q output of the monostable 23, so that the above-described cycle repeats.

It will be observed that all the time the RESET input to the monostable 23 is held high, successive ultrasonic bursts will continue to be transmitted by the transmitter 13 and detected by the detector 14, since the detection of each burst triggers the transmission of the next.

Furthermore, the rate at which the ultrasonic bursts follow one another, and hence the rate at which the inverted pulses appear on the line 28, is directly proportional to the speed of air flowing in the direction from the transmitter 13 to the detector 14, provided the transducers are stationary. Of course this is because the apparent speed of sound between the transducers is $(V+S)$ where V is the speed of the air flow and S is the speed of sound in still air.

The basic principle of operation of the apparatus is to measure this rate when the transducers 13 and 14 are located in the air flow, with the transducer 14 directly downstream of the transducer 13, in particular by counting the number of pulses CK passing the point P on the line 28 in a fixed pre-determined period of time, in this case one second.

This is then compared with a reference number which is the number of pulses which would pass the point P in a one second period if the transducers were located in still air at the same temperature, and the difference represents the speed of the air flow. The apparatus derives this reference number either by sampling the external air temperature using a thermistor probe and determining the reference number using the known relationship between the speed of sound in still air and temperature, or by actually measuring the reference number by performing a calibration measurement in still air.

These operations are controlled by a programmed microprocessor 22, which has inputs from the point P on the line 28 and from an external air temperature sensor (not shown) such as a thermistor probe, and provides outputs to drive the display 31 and also an output to an ENABLE line 29.

The ENABLE line 29 is connected directly to the RESET input of the monostable 23, so that while the ENABLE line 29 is held low the monostable cannot generate the 40 us pulses mentioned above. Thus the microprocessor can define each one-second counting period referred to above by raising the ENABLE line 29 for one second.

Further, the ENABLE line is connected via an inverter 30 and an RC circuit comprising a capacitor C1 and the resistor R1 to the TRIGGER input of the monostable 23. Thus each leading (positive-going) edge on the ENABLE line 29 will first be inverted and then via the RC circuit provide a short 1 us negative-going pulse to the TRIGGER input of the monostable 23.

This will cause the monostable 23 to generate a single 40 us pulse at the start of each one-second counting period. This is necessary, of course, because prior to the stark of such period the monostable was held disabled by a low on the ENABLE line 29 so that the first 40 us in each one-second period cannot be triggered by the detection of a previous burst because there was none.

Figure 3:
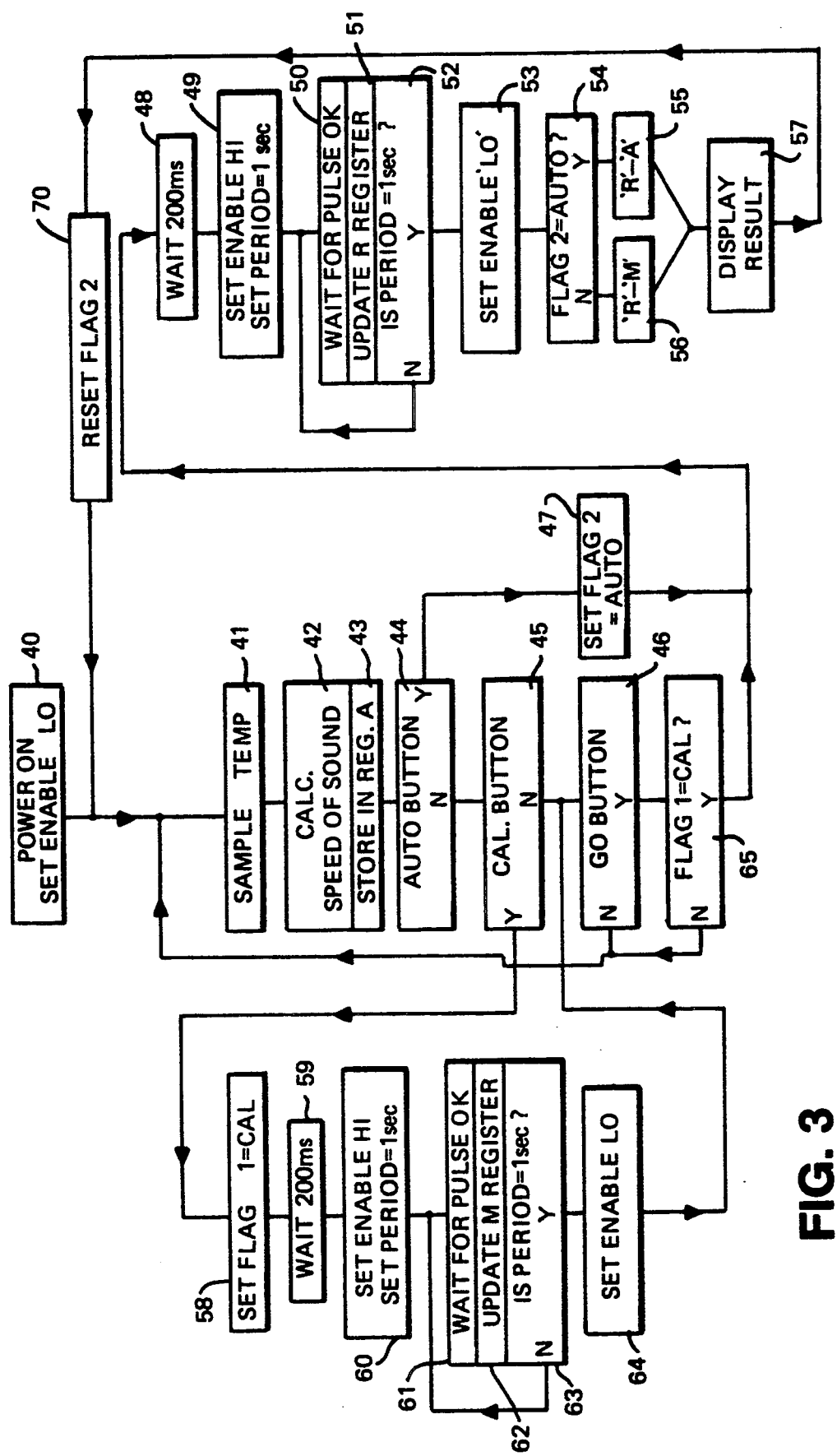
FIG. 3 is a flow diagram of the control program stored in the microprocessor forming part of the block circuit diagram of FIG. 2.

The operation of the apparatus will now be described with reference to FIG. 3, which is a flow chart of the main steps of the control program shored in the microprocessor 22.

Upon power on (ON-OFF switch 15, FIG. 1) the microprocessor initialises, including setting the ENABLE line 29 low, step 40.

Next the external ambient temperature is sampled, step 41. Then, in step 42, the microprocessor calculates a reference number which is the number of inverted pulses which would be detected at the point P on line 28 during a one-second period if the apparatus were operated as described above the transducers 13 and 14 in still air at the temperature of the thermistor probe.

This number is uniquely defined by the separation (0.1) meter of the transducers 13 and 14 and the speed of sound in still air at the temperature concerned, since there is a known relationship between the speed of sound in still air and temperature. The reference number may be obtained from a look-up table stored internally in the microprocessor, different values of the reference number corresponding to different temperatures having been pre-calculated. In fact, in the present case where the gap between the transducers is 0.1 meter, the reference number will be ten times the speed of sound in still air, in meters per second, at the temperature concerned.

The reference number is stored in an internal register (register A) in step 43.

Now in step 44 the AUTO button 16 (FIG. 1) is polled to see if it is currently pressed. If it is not the CALIBRATE button 18 is likewise polled in step 45, and if that is also not pressed the GO button 17 is polled in step 46. If the GO button is not pressed then the program loops back to the temperature sensing step 41. Thus all the while that none of the AUTO, CALIBRATE and GO buttons are pressed, the program cycles round steps 41 to 46, updating the stored reference number each time in accordance with changes at ambient temperature.

If we now assume that the AUTO button is pressed, the program will branch to step 47, and set a flag (flag 2) to "AUTO". Now the program waits 200 ms (200 milliseconds) in step 48 to allow any transients which may have been generated by pressing the button to die away.

After the 200 ms wait, at step 49 the program sets the ENABLE line 29 high, and at the same time starts an internal timer to measure a one-second period. As previously described, putting the ENABLE line 29 high enables the monostable 23 to generate 40 us pulses, and further the leading edge of the ENABLE line 29 going high will cause the monostable 23 to generate an initial such 40 us pulse via the inverter 30 and the RC circuit.

Once the first pulse has been generated, and the corresponding burst of ultrasound transmitted by the transducer 13, the detection of such burst by the detector 14 will trigger a second pulse by the monostable 23, and the second a third, and so on as previously described. Thus all the while the RESET input of the monostable 23 remains high successive bursts of ultrasound will pass across the gap between the transducers at a rate dependent upon the speed of air flow across the gap, and inverted pulses CK from the envelope detection circuit 27 will pass the point P on the line 28 at the same rate.

The pulses CK on the line 28 are counted in steps 50 to 52 of the control program. In step 50 the microprocessor waits for a pulse on the line 28 and when one is detected it increments a counter (register R) in step 51. Then in step 52 it looks to see if the internal timer has measured one second. If not the program loops back to step 50. The program cycles round this loop until the internal timer shows that one second has elapsed.

At the end of one second the program goes to step 53, where it puts the ENABLE line 29 low. This stops the further generation and circulation of bursts and pulses by lowering the RESET input to the monostable 23. The count then in the register R is the total number of pulses which have passed the point P, and hence the number of bursts of ultrasound which have passed across the 0.1 meter gap between the transducers 13 and 14, in the preceding one second interval.

For a transducer gap of 0.1 meter, the number in the register R will be ten times the speed of sound (in meters per second) relative to the transducers, which must be held stationary in the moving air with the transducer 14 downstream of the transducer 13 for a correct measurement to be taken.

Now, in step 54, the program tests whether the flag 2 is set to "AUTO". Since it was so set in step 47, the program moves to step 55, where it subtracts the reference number stored in the register A (step 43) from the current number stored in the register R. The result is ten times the speed of air flow across the transducer gap, in meters per second. This result is converted to the appropriate format, e.g. knots, miles per hour, etc., and displayed on the LCD 31 in step 57. A simple division by ten will give the air flow speed in meters per second.

Now the program loops back to step 41 via step 70, where flag 2 is reset, and provided the AUTO button is held down the whole process cycles through again, thereby repeatedly updating the reference number stored in the register A and measuring the current air flow speed.

This describes the apparatus operating in AUTO mode, so-called because it does not require any calibration measurement to be made in still air. The MANUAL mode, which does require a calibration, will now be described.

Assume now that when the program cycles through steps 41 to 46 the AUTO button has not been pressed, or it has been released, and that the CALIBRATE button is pressed. This will be detected at step 45, whereupon the program branches to step 58. Here is set a flag (flag 1) to "CALIBRATE".

Now the program cycles through steps 59 to 64 which are identical to steps 48 to 53 already described, with one difference. The pulses CK counted at the point P on the line 28 are stored in a separate register M in step 62, rather than the register R using in the AUTO mode.

Thus at the end of step 64 one has in the register M a reference number which is the number of inverted pulses CK which were detected at the point P on line 28 during the immediately preceding one-second period. This is referred to as the reference number because the calibration, to be accurate, has to be performed in still air at the same temperature as the moving air whose speed it is desired to measure. It is assumed that this was the case. As mentioned previously, for a 0.1 meter transducer gap, the reference number in the register M will be ten times the speed of sound in still air at the temperature concerned.

Now the program moves to step 46, where it sees if the GO button is pressed. Assuming that it is, step 65 test the flag 1 for being set to "CALIBRATE", and since it has been the program repeats all of steps 48 to 53 previously described. Of course, it is assumed that the GO button will now have been pressed until the transducers were inserted in the air flow to be measured.

Thus after step 53 the count then in the register R is, as previously described, the total number of pulses CK which have passed the point P, and hence the number of bursts of ultrasound which have passed across the 0.1 meter gap between the transducers 13 and 14, in the preceding one second interval. This will be ten times the speed of sound in meters per second of the ultrasonic bursts relative to the stationary transducers.

Next in step 54 the program again tests the flag 2 for being set at "AUTO". This time it isn't, because the flag was reset at step 70, or was never set if the AUTO button hasn't been pressed since power on, and thus the program moves to step 56 where it subtracts the reference number stored in the register M (step 62) from the current number stored in the register R. The result is ten times the speed of air flow across the transducer gap, in meters per second. Again this result is converted to the appropriate format and displayed on the LCD 31 in step 57.

It is to be seen that in step 46, if the program detects that the GO button has been pressed and then finds in step 65 that the flag 1 has not been set to "CALIBRATE", indicating that no calibration has been performed, the program is forced back to step 41. This ensures that in the MANUAL mode the CALIBRATE button must be pressed before the GO button for the latter to have any effect.

This completes the MANUAL mode, and after step 57 the program loops back to step 41 again, ready for another AUTO mode measurement, or another MANUAL mode measurement.

It will be observed that after power on, the program can switch between AUTO and MANUAL modes at will. Thus the reference number stored in the register A (step 43) is always kept current, whether the control program is simply cycling around steps 41 to 46, or performing a MANUAL mode calibration or moving air measurement. Thus an AUTO mode measurement can be made at any time, even following a calibration. Similarly, once a calibration has been made, the corresponding reference number stored in register M is retained, and always available for use until updated by a new calibration measurement, even if the AUTO button and not the GO button is pressed immediately following a calibration.

Figure 4A:
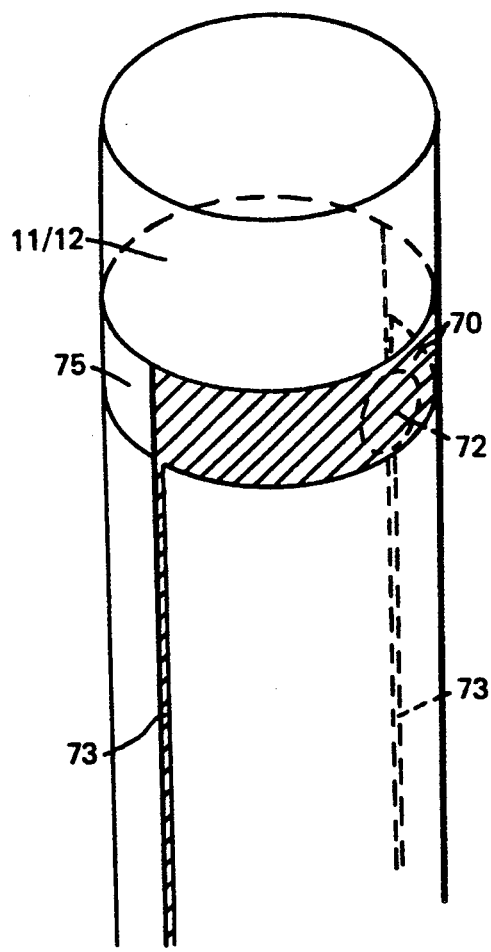
FIGS. 4A and 4B are, respectively, a perspective view of one of the transducers of FIG. 1, and a cross-section through the transducer.
Figure 4B:
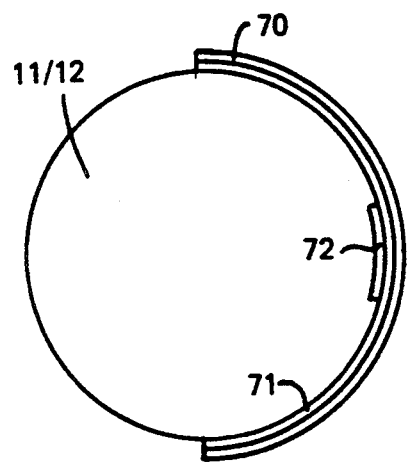

Referring now to FIGS. 4A and 4B, each transducer 13 and 14 is provided on a respective support column 11 or 12 of circular cross-section rigid plastics material, and comprises a strip 70 of piezoelectric film fastened to the column by, fox example, double side adhesive tape 71. The piezoelectric film 70 is metallised on each side and may be that sold under the name "KYNAR Piezo Film" by Pennwalt Pietro Film Ltd., of Hillend Industrial Park, Dunfermline, Fife, Scotland. The double-sided adhesive tape 71 may be that sold under the name "Sellotape".

The column 11 or 12 is about 3 mm in diameter, and the piezoelectric strip is about 3 mm wide in the vertical direction of the column. The film 70 extends at least around 180 degrees of the circumference of the column, as shown in FIGS. 4A and 4B. The strip 70 is shown set into a shallow circumferential recess 75 around the column, but this is not necessary.

A circular recess 72 may be provided in the column 11 or 12 behind the piezoelectric film 70, centrally of the strip. The recess 72 may be about 0.02 deep and about 2 mm in diameter. The recess may be filled with air, or a resilient damping material.

The piezoelectric film 70 has two leads 73, formed of the same material as the film itself, extending from the opposite narrow edges of the film down the column for connection to the internal circuit of the apparatus, one lead being connected to the metallisation on one side of the film and the other lead being connected to the metallisation on the other side of the film.

The transducers are mounted on the housing 10 (FIG. 1) with the recesses 72 facing one another.

Figure 5A:
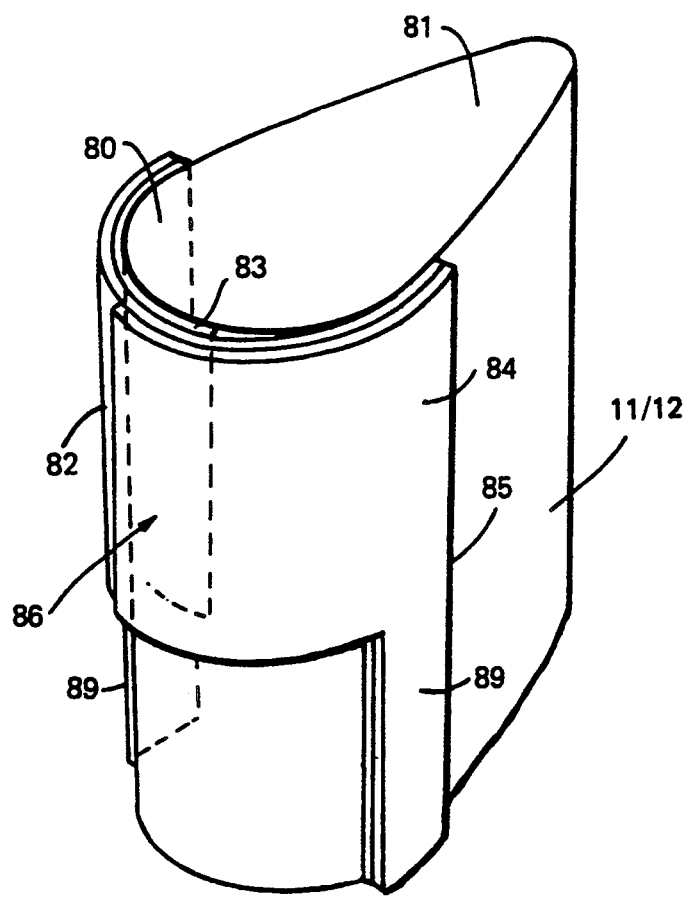
FIG. 5A is a perspective view of an alternative construction for each of the transducers of FIG. 1.
Figure 5B:
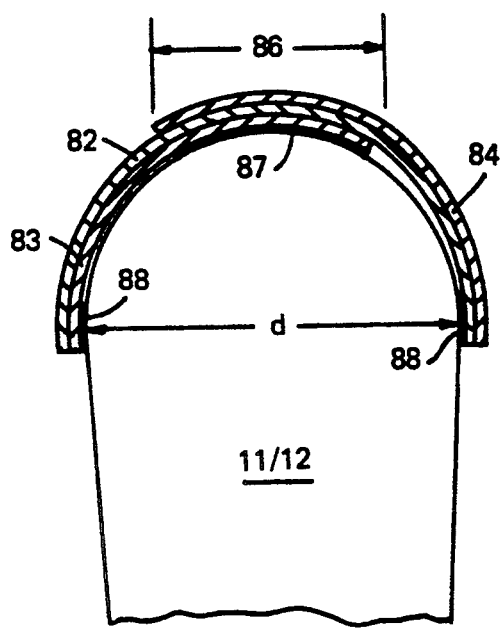
FIG. 5B is a cross-sectional view through the front of the transducer of FIG. 5A.
Figure 5C:
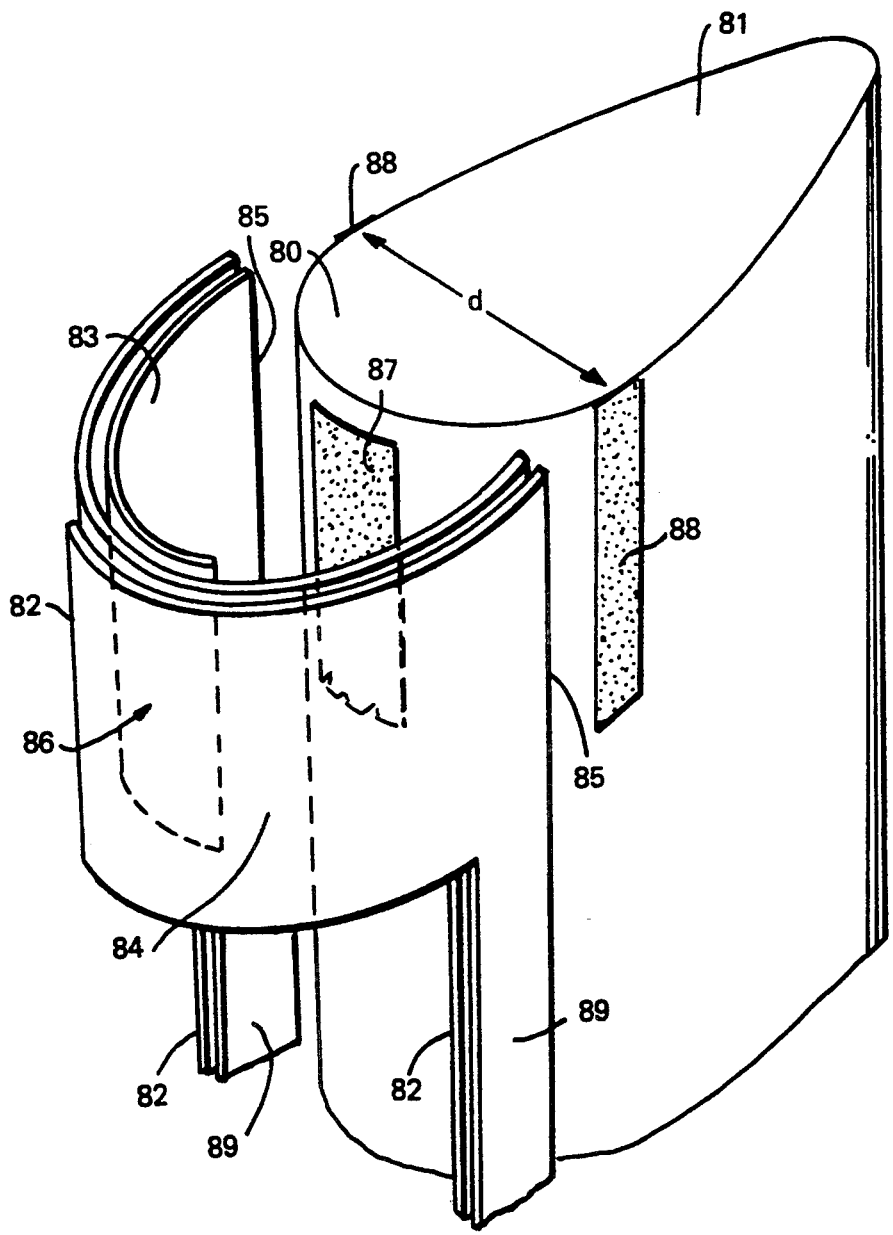
FIG. 5C is an exploded view of the transducer of FIG. 5A.

Referring now to FIGS. 5A, 5B and 5C, according to an alternative construction to that shown in FIGS. 4A and 4B, each transducer 13 and 14 is provided on a respective support column 11 or 12 of rigid plastics material. The column 11 or 12 is of aerofoil-like cross-section, having a convex front portion 80, which in this case is substantially semi-circular, and a tapering rear portion 81.

The transducer proper comprises a piezoelectric film 82 having in intimate contact with each of its two opposite surfaces a respective metal electrode 83 and 84. The electrodes 83 and 84 are not co-extensive with the film 82, but each extends from a respective one of the two lateral edges 85 of the film 82 to the central region 86 of the film, where it overlaps the other foil electrode.

The laminate 82/83/84 is mounted around the semi-circular front portion 80 of the column 11 or 12, and is held in tension across a narrow strip of resilient damping material 87 which is mounted in the centre of the front portion 80. In particular, the laminate is first fixed at one edge 85 to the side of the column by, for example, a strip 88 of double-sided adhesive tape, then squeezed around the column across the strip of damping material 87, and then fixed at the other edge 85 to the other side of the column by a further strip 88 of double-aided adhesive tape. In this way the laminate is tensioned across the damping material 87, with the central overlap region 86 of the laminate immediately in front of the strip 87.

Each electrode 83 and 84 has a respective integral lead 89 extending from a respective one of the edges 85 down the column 11 or 12 for connection to the internal circuitry of the apparatus. The piezoelectric film 82 is continued down each lead 89 to provide a support backing for each electrode. The transducers are mounted on the housing 10 (FIG. 1) with the central overlap regions 86 facing one another, i.e. with their tapering rear portions 81 pointing away from one another.

The laminate consisting of the piezoelectric film 82 and the electrodes 83 and 84 may be made from a metallised piezoelectric film such as that sold under the name KYNAR by Pennwalt Piezo Film Limited, of Hillend Industrial Park, Dunfermline, Fife, Scotland. KYNAR is a piezoelectric film typically 28 or 52 microns thick which is metallised on each side to a thickness of about 6 microns, typically with copper, gold or silver. The electrodes 83 and 84 are formed by selectively etching the metallisation away on each side of the KYNAR film to leave the two overlapping electrodes 83 and 84 shown, with the integral leads 89.

The double-sided adhesive tape 88 may be that sold under the name SELLOTAPE. The damping material 87 may be thick single-sided adhesive tape, also sold under the name SELLOTAPE.

When the transducer is used as an ultrasonic transmitter an AC voltage of ultrasonic frequency is applied across the electrodes 89. This causes mechanical oscillation of the piezoelectric film 82, primarily in the overlap region 86. When the transducer is used as an ultrasonic detector vibration of the piezoelectric film 82 by an external sound wave will induce a corresponding voltage across the electrodes 89.

The maximum frequency response of the transducer is dependent upon the distance d across the convex front portion 80 of the column 11 or 12. In the present case the distance d is 3 mm, giving a maximum frequency response of 250 Khz. The Q of the transducer is, dependent upon the tension in the laminate 82/83/84 and the degree of resilience of the damping material 87.

If desired, instead of using the strip of damping material 87, as in FIG. 4 one may provide a shallow recess in the column 11 or 12 behind the overlap region 86, and the recess may be filled with a damping material. In such case the laminate 82/83/84 is tensioned across the recess.

We have found that transducers constructed generally as above can, by suitable choice of the parameters mentioned, be designed to have a very low Q, of the order of one, permitting the transducer gap to be as low as 0.1 meter or less.

Furthermore, transducers constructed as above are found to possess the ability to produce a reading which is on average the air flow speed in the vicinity of the apparatus. This is because the transmitter produces a saucer-shaped wavefront which expands as it travels towards the detector. If the air is moving at different speed on each side of the transducers, the centre of the wavefront, which is the part detected by the detector, tends to move at the average of the speeds of the air on either side.

However, as mentioned in the introduction, conventional ultrasonic transducers may be used in the invention, but it these cannot be obtained with a very low Q the distance apart of the transducers may need to he increased. Alternatively, the number of oscillator cycles defined by the monostable 23 can be decreased, say to two, but this requires extra circuitry to properly define and detect these reliably.

The advantages of air flow speed apparatus according to the invention are:
1. It can be manufactured very cheaply.
2. It has no moving parts.
3. It can be designed for very low power consumption. For example, it may be powered by camera-type button batteries, or even by solar power.
4. It can be designed to give a very high accuracy in all air movement speeds not attainable with existing devices.

I claim:

1. An ultrasonic transducer comprising a support member, a piece of resilient material mounted on the support member, a film of piezo-electric material mounted on the support member under tension cross the resilient material, first and second metal foil electrodes in intimate contact with each of the two opposite surfaces of the film respectively, the first and second electrodes overlapping in front of the resilient material, and a respective electrical lead connected to each electrode.

2. An ultrasonic transducer according to claim 1, wherein the support member is a column, and the film is mounted at least partially around the circumference of the column.

3. An ultrasonic transducer as claimed in claim 2, wherein each electrical lead is formed by an extension of the respective electrode extending axially of the column.

4. An ultrasonic transducer as claimed in claim 1, wherein the column has an aerofoil-like cross-section with the first and second electrodes overlapping at the leading edge.

* * * * *